US006856957B1

(12) United States Patent
Dumoulin

(10) Patent No.: US 6,856,957 B1
(45) Date of Patent: Feb. 15, 2005

(54) QUERY EXPANSION AND WEIGHTING BASED ON RESULTS OF AUTOMATIC SPEECH RECOGNITION

(75) Inventor: Benoit Dumoulin, Montreal (CA)

(73) Assignee: Nuance Communications, Menlo Park, CA (US)

( * ) Notice: Subject to any disclaimer, the term of this patent is extended or adjusted under 35 U.S.C. 154(b) by 817 days.

(21) Appl. No.: 09/779,023

(22) Filed: Feb. 7, 2001

(51) Int. Cl.[7] .............................................. G10L 21/06
(52) U.S. Cl. .................... 704/257; 704/270.1; 704/275; 379/88.01
(58) Field of Search ............................... 704/231, 251, 704/257, 275, 270.1, 272, 256; 379/88.01, 88.02, 88.03

(56) References Cited

U.S. PATENT DOCUMENTS

| | | | | | |
|---|---|---|---|---|---|
| 5,675,707 | A | * | 10/1997 | Gorin et al. ................. | 704/257 |
| 6,269,153 | B1 | * | 7/2001 | Carpenter et al. ........ | 379/88.02 |
| 6,415,257 | B1 | * | 7/2002 | Junqua et al. .............. | 704/275 |
| 6,418,431 | B1 | * | 7/2002 | Mahajan et al. ................ | 707/4 |
| 6,519,562 | B1 | * | 2/2003 | Phillips et al. .............. | 704/240 |
| 2002/0087309 | A1 | * | 7/2002 | Lee et al. .................... | 704/240 |
| 2002/0087316 | A1 | * | 7/2002 | Lee et al. .................... | 704/257 |
| 2002/0116174 | A1 | * | 8/2002 | Lee et al. ........................ | 704/9 |
| 2002/0133341 | A1 | * | 9/2002 | Gillick et al. ............... | 704/235 |

OTHER PUBLICATIONS

S.E. Johnson, P. Jourlin, G.L. Moore, K. Sparck Jones, P.C. Woodland, "Spoken Document Retrieval for TREC–7 at Cambridge University", *The Seventh Text Retrieval Conference (TREC 7)*, Jul. 1999, pp. 191–200, Gaithersberg, Maryland.

M.A. Siegler, M. J. Witbrock, S. T. Slattery, K. Seymore, R.E. Jones, A. G. Hauptmann, "Experiments in Spoken Document Retrieval at CMU", *The Sixth Text Retrieval Conference (TREC–6)*, Aug. 1998, pp. 291–302, Gaithersberg, Maryland.

Mathew A. Siegler, Integration of Continuous Speech Recognition and Information Retrieval for Mutually Optimal Performance, Dec. 15, 1999, pp. 2–79, Pittsburgh, Pennsylvania.

Jennifer Chu–Carroll, Bob Carpenter, "Vector–based Natural Language Call Routing", *Computational Linguistics*, Sep. 1999, pp. 361–388, vol. 25, No. 3, MIT Press for the Association of Computational Linguistics.

Jennifer Chu–Carroll, Bob Carpenter, "Dialogue Management in Vector–Based Call Routing", *COLING–ACL '98, 36th Annual Meeting of the Association for Computational Linguistics, and 17th International Conference on Computational Linguistics, Proceeding of the Conference*, Aug. 1998, pp. 256–262, vol. 1, Montreal, Quebec, Canada.

Matthew Siegler, Michael Witbrock, "Improving the Suitability of Imperfect Transcriptions for Information Retrieval from Spoken Documents", *Proc. of the IEEE International Conference on Acoustics, Speech, and Signal Processing*, Mar. 1999, pp. 505–508, vol. 1, Phoenix, Arizona.

* cited by examiner

*Primary Examiner*—Susan McFadden
(74) *Attorney, Agent, or Firm*—Blakely, Sokoloff, Taylor & Zafman LLP

(57) ABSTRACT

A technique for identifying one or more items from amongst a plurality of items in response to a spoken utterance is used to improve call routing and information retrieval systems which employ automatic speech recognition (ASR). An automatic speech recognizer is used to recognize the utterance, including generating a plurality of hypotheses for the utterance. A query element is then generated for use in identifying one or more items from amongst the plurality of items. The query element includes a set of values representing two or more of the hypotheses, each value corresponding to one of the words in the hypotheses. Each value in the query element is then weighted based on hypothesis confidence, word confidence, or both, as determined by the ASR process. The query element is then applied to the plurality of items to identify one or more items which satisfy the query.

43 Claims, 4 Drawing Sheets

QUERY EXPANSION AND WEIGHTING BASED ON RESULTS OF AUTOMATIC SPEECH RECOGNITION

FIELD OF THE INVENTION

The present invention pertains to speech-responsive call routing and information retrieval systems. More particularly, the present invention relates to a method and apparatus for using output of an automatic speech recognizer to improve a query in a call routing or information retrieval system.

BACKGROUND OF THE INVENTION

Call routing systems and information retrieval system are technologies which help users to identify and select one or more items from among a number of similar items. Call routing systems are commonly used by businesses which handle a large volume of incoming telephone calls. A conventional call routing system uses audio prompts to present a telephone caller with a choice of several selectable options (e.g., topics, people, or departments in an organization). The system then receives a request input by the caller as, for example, dual-tone multiple frequency (DTMF) tones from the caller's telephone handset, associates the caller's request with one of the options, and then routes the call according to the selected option. In a more "open-ended" call routing system, the caller may simply specify a person or other destination and is not limited to a specified set of options.

Information retrieval systems are commonly used on the World Wide Web, among other applications, to assist users in locating Web pages and other hypermedia content. In a conventional information retrieval system, a software-based search engine receives a text-based query input by a user at a computer, uses the query to search a database for documents which satisfy the query, and returns a list of relevant documents to the user. The user may then select one of the documents in the list to access that document.

Call routing and information retrieval systems can be enhanced by adding automatic speech recognition (ASR) to their capabilities. By using ASR, a user can simply speak his or her request or selection. A natural language speech recognition engine automatically recognizes the user's spoken request and outputs a text-based query, which is then used in essentially the same manner as in a more conventional call routing or information retrieval system. Among other advantages, adding ASR capability to call routing and information retrieval technologies saves time and provides convenience for the user. One problem with using ASR to augment these technologies, however, is the potential for introducing additional error from the ASR process, thus degrading system performance. In a conventional system (i.e., one which does not use ASR), the query is typically input in the form of text, DTMF tones, or some other format which is not particularly prone to error or ambiguity. In contrast, a spoken query may contain both grammatical and syntactical errors (e.g., skipped words, inversions, hesitations). Also, even the best natural language speech recognizers produce recognition errors. Consequently, an ASR-augmented call routing or information retrieval system is susceptible to recognition errors being propagated into the query, reducing the effectiveness of the resulting call routing or information retrieval operation.

SUMMARY OF THE INVENTION

The present invention provides a method and apparatus for identifying one or more items from amongst multiple items in response to a spoken utterance. In an embodiment of the method, an automatic speech recognizer is used to recognize the utterance, including generating multiple hypotheses for the utterance. A query element is then generated based on the utterance, for use in identifying one or more items from amongst the multiple items. The query element includes values representing two or more hypotheses of the multiple hypotheses.

Other features of the present invention will be apparent from the accompanying drawings and from the detailed description-which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and apparatus for using the output of an automatic speech recognizer to improve a query in a call routing or information retrieval system are described. Note that in this description, references to "one embodiment" or "an embodiment" mean that the feature being referred to is included in at least one embodiment of the present invention. Further, separate references to "one embodiment" in this description do not necessarily refer to the same embodiment; however, neither are such embodiments mutually exclusive, unless so stated and except as will be readily apparent to those skilled in the art. Thus, the present invention can include any variety of combinations and/or integrations of the embodiments described herein.

The technique described below can be used to improve call routing and information retrieval systems which employ automatic speech recognition (ASR). Briefly, the information retrieval or call routing process is made more accurate by forming an expanded query from all of the hypotheses in the n-best list generated by the speech recognizer, and by weighting the query with the confidence scores generated by the recognizer. More specifically, and as described further below, the ASR process is used to recognize a user's utterance, representing a query. The ASR process includes generating an n-best list of hypotheses for the utterance. A query element is generated, containing values representing all of the hypotheses from the n-best list. Each value in the query element is then weighted by hypothesis confidence, word confidence, or both, as determined by the ASR process. The query element is then applied to the searchable items to identify one or more items which satisfy the query.

Figure 1:
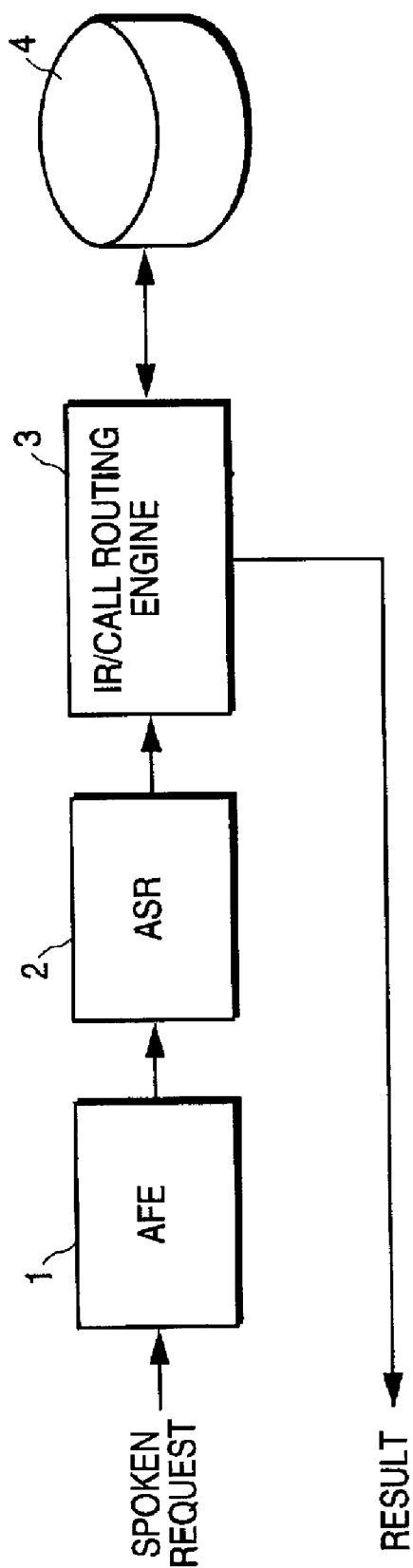
FIG. 1 is a high-level block diagram of a call routing or information retrieval system which employs ASR capability.

FIG. 1 is a high-level block diagram of a system which may be used to for call routing, information retrieval, or both, in accordance with the present invention. The system includes an audio front end (AFE) 1, an ASR subsystem 2, an information retrieval (1R)/call routing engine 3, and a database 4. The database 4 stores the set of destinations, documents, or other types of data (hereinafter simply "destinations") that can be searched on and potentially selected by a user. The destinations contained in database 4 may be essentially any type of information, such as text or audio or both.

The audio front end 1 receives speech representing a query from the user via any suitable audio interface (e.g., telephony or local microphone), digitizes and endpoints the speech, and outputs the endpointed speech to the ASR subsystem 2. The audio front end 1 is composed of conventional components designed for performing these operations and may be standard, off-the-shelf hardware and/or software.

The ASR subsystem 2 performs natural language speech recognition on the endpointed speech of the user, and outputs a text-based query vector to the information retrieval/call routing engine 3. The ASR subsystem 2 contains conventional ASR components, including a natural language speech recognition engine, language models, acoustic models, dictionary models, user preferences, etc. The information retrieval/call routing engine 3 receives the query vector and, in a conventional manner, accesses the database 4 to generate a list of one or more results which satisfy the query. Accordingly, the information retrieval/call routing engine 3 includes conventional components for performing vector-based call routing and or information retrieval.

It will be recognized that certain components shown in FIG. 1, particularly the ASR subsystem 2 and the information retrieval/call routing engine 3, may be implemented at least partially in software. Such software may be executed on one or more conventional computing platforms, such as personal computers (PCs), workstations, or even hand-held computing devices such as personal digital assistants (PDAs) or cellular telephones. These components may also be distributed across one or more networks, such as the Internet, local area network (LANs), wide area networks (WANs), or any combination thereof. Likewise, these components may be implemented at least partially in specially-designed hardwired circuitry, such as application specific integrated circuits, programmable logic devices (PLDs); or the like. Thus, the present invention is not limited to any particular combination of hardware and/or software.

Operation of the system may be categorized into two phases: training and run-time. The system employs a standard vector-based approach, which is augmented according to the present invention. One example of a vector-based call routing approach which may be used for purposes of this invention is described in J. Chu-Carroll et al. "Vector-Based Natural Language Call Routing", Computational Linguistics, vol. 25, no. 3, September 1999, which is incorporated herein by reference.

Prior to run-time, the system of FIG. 1 is trained using standard vector-based call routing/information retrieval techniques. More specifically, training may be accomplished by using the technique of latent semantic indexing (LSI). The LSI technique is described in S. Deerwater et al., "Indexing by Latent Semantic Analysis", Journal of the American Society for Information Science, 41(6), pp. 391407 (1990), which is incorporated herein by reference. The technique includes building an M×N term-destination matrix containing the frequency of occurrence of terms (word n-grams) for each destination, where M represents the total number of distinct terms (and rows in the matrix) in all of the destinations to be searched and N represents the total number of destinations (and columns in the matrix). Thus, the term-destination matrix contains a set of values, each of which represents the frequency of occurrence of a particular term in a particular destination. The term-destination matrix is then weighted according to a standard weighting technique used in call routing or information retrieval, such as inverse document frequency (IDF). The dimensionality of the matrix is then reduced using a standard technique such as singular value decomposition (SVD).

Figure 2:
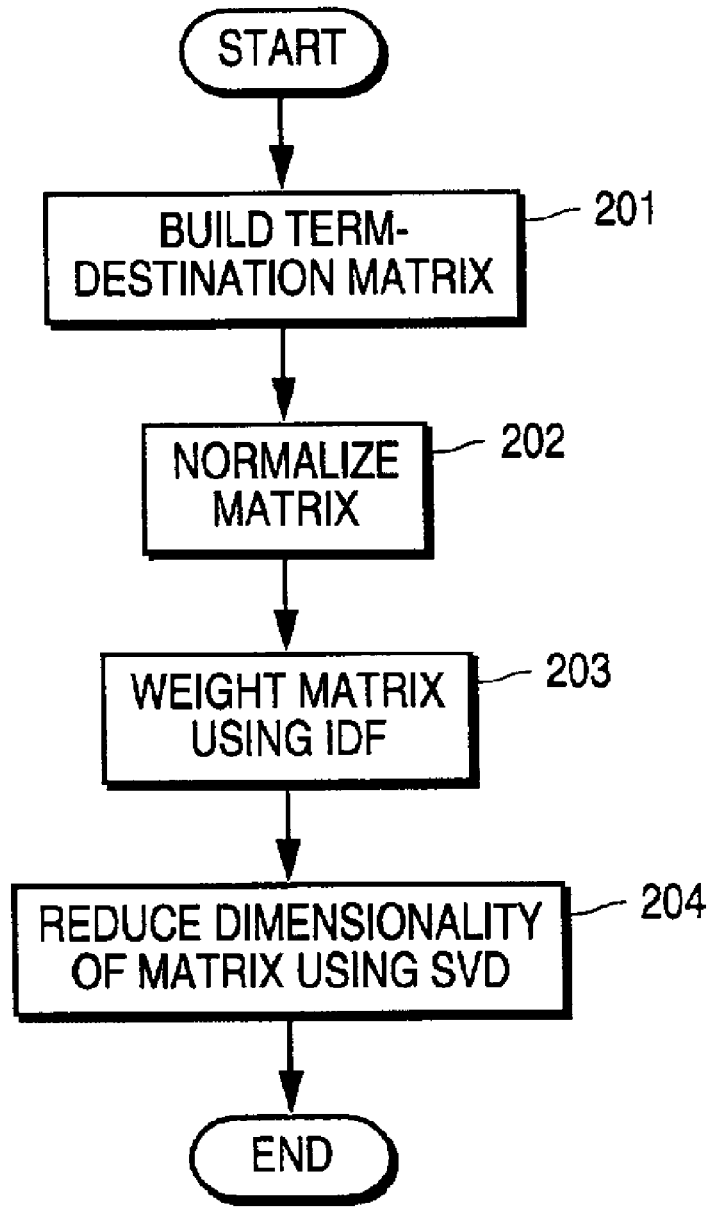
FIG. 2 is a flow diagram illustrating a training process associated with the system of FIG. 1.

FIG. 2 illustrates the LSI training process according to one embodiment. Initially, at block 201, the term-destination matrix is constructed. At block 202, the term-destination matrix is normalized so that each term vector (row of the matrix) is of unit length (i.e., by dividing each value by the number of values and its row). Next, the matrix is further weighted using IDF at block 203. IDF involves weighting the value for each term inversely to the number of documents in which the term occurs, as is well-known in the art. At block 204, the weighted matrix is reduced in dimensionality using SVD. The SVD process produces two matrices, i.e., an M×N "transformation" matrix and an N×N matrix, the columns of which represent the eigenvectors.

Figure 3:
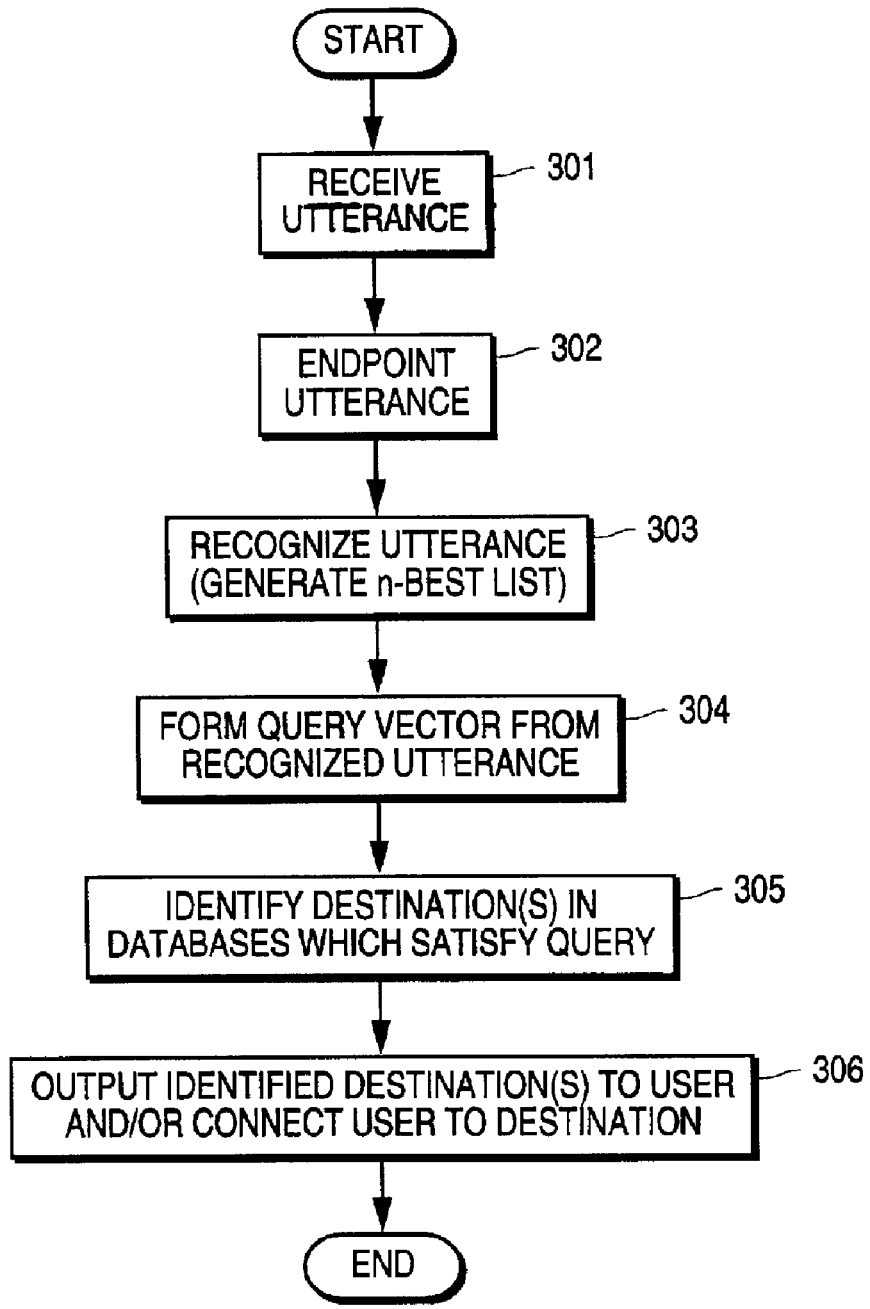
FIG. 3 is a flow diagram showing a run-time call routing or information retrieval process associated with the system of FIG. 1.

FIG. 3 illustrates the run-time process of the system, according to one embodiment. Initially, an utterance (a request) is received from the user at block 301. The utterance is endpointed at block 302, and then recognized by the ASR subsystem 2 at block 303. As noted above, a result of the ASR process is the generation of an n-best list of hypotheses for the utterance. At block 304, a text-based query vector is formed by the information retrieval/call routing engine 3 based on the recognized utterance, as described further below. At block 305, one or more destinations in database 4 which satisfy the query are identified by the information retrieval/call routing engine 3. Those identified items which meet a predetermined threshold for similarity to the query vector are then indicated and/or provided to the user at block 306. In the case of a call routing system, this may involve simply connecting the user to the destination which most closely matches the query. In an information retrieval system, this may involve outputting to the user a list of "hits", i.e., destinations which most closely match the query.

Figure 4:
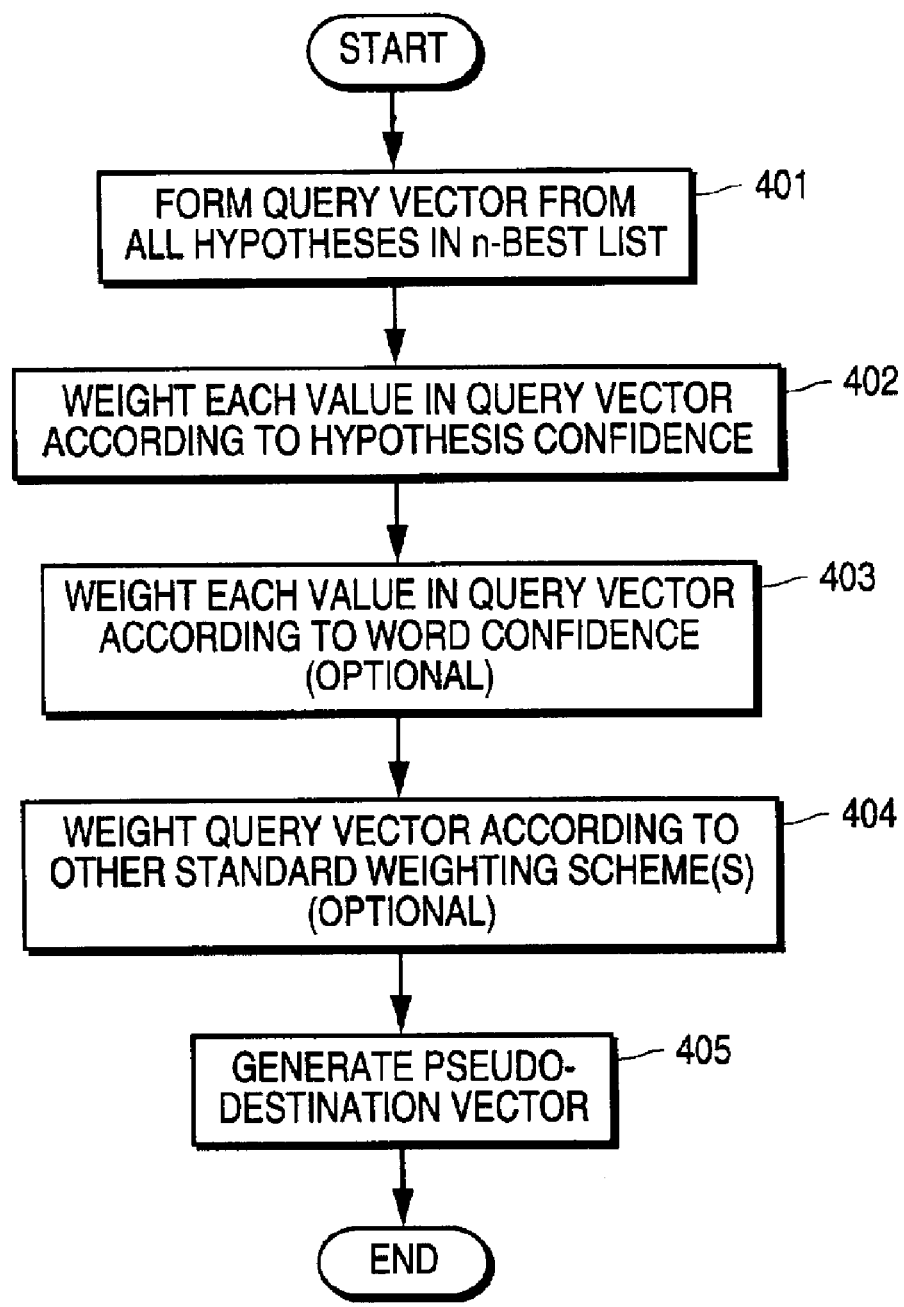
FIG. 4 is a flow diagram showing a process for generating a query based on an n-best list output by a speech recognizer.

FIG. 4 shows the process of forming a query vector (block 304) in greater detail, according to one embodiment. At block 401, the information retrieval/call routing engine 3 forms a query vector from all of the hypotheses in the n-best list resulting from the speech recognition process. This operation may involve simply concatenating all of the hypotheses in the n-best list and then representing this result in standard vector form. Note that while it may be preferable to use all of the hypotheses in the n-best list to form the query vector, it is not necessary to do so. In other words, the system may use more than one, but not all, of the hypotheses in accordance with the present invention; this would still provide a performance improvement over prior approaches.

Assume now that a user actually uttered the phrase "books about the Internet". Assume further that the ASR subsystem generates a simple three-hypothesis n-best list as follows:

| Hypothesis no. | Hypothesis |
| --- | --- |
| 1 | books about the Internet |
| 2 | looks about the Internet |
| 3 | books of the Internet |

Although an actual n-best list would likely be longer than this one, a simple example is chosen here to facilitate explanation. Thus, in accordance with the present invention, the ASR subsystem 2 would generate a query vector representing the concatenation of all three hypotheses, i.e., "books about the Internet looks about the Internet books of the Internet".

Next, at block 402 each value in the query vector is weighted according to its hypothesis confidence, i.e., according to the confidence score, or rank, of the hypothesis to which the value corresponds. For example, the individual vector values which represent the phrase "books about the Internet" are each assigned the highest weight, because that phrase corresponds to the highest-ranked hypothesis in the n-best list, i.e., the hypothesis that the highest confidence level. In contrast, the values representing the phrase "books of the Internet" are assigned the lowest weight, because that phrase corresponds to the lowest-ranked hypothesis, i.e., the hypothesis with the lowest confidence level.

Next, at block 403, optionally, each value in the query vector is further weighted according to its word confidence, i.e., according to a confidence score of the particular word which the value represents. The word confidence score may be, for example, a measure of the number of times the word occurs in the n-best list. For example, the word "Internet" appears in all three of the hypotheses in the above n-best list, and accordingly, would be assigned the highest relative weight in this operation. In contrast, the word "of" occurs only once in the n-best list, and therefore would be assigned the lowest weight in this operation. Of course, other ways of measuring word confidence are possible, as will be recognized by those skilled in the art.

Any additional standard weighting techniques can then optionally be applied at block 404, such as may be used in other vector-based information retrieval or call routing approaches. Finally, at block 405, a pseudo-destination vector is formed from the query vector by reducing the dimensionality of the query vector from M to N, to allow a similarity comparison with the transformed term-destination matrix.

Referring again to the overall run-time process of FIG. 3, in one embodiment block 305 involves comparing the pseudo-destination vector to each of the N eigenvectors to determine which is the closest, according to a standard dot product measure (i.e., cosine score between the vectors). Of course, other methods may alternatively be used to determine similarity between the eigenvectors and the query, such as using the Euclidean distance or the Manhattan distance between the vectors.

Thus, combining the LSI technique with IDF corrects for grammatical and syntactical errors in the query. The use of all (or at least more than one) of the hypotheses in the n-best list in forming the query reduces call routing or information retrieval errors due to speech recognition errors.

Thus, a method and apparatus for using the output of an automatic speech recognizer to improve a query in a call routing or information retrieval system have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method of identifying one or more items from amongst a plurality of items in response to a spoken utterance, the method comprising:

using an automatic speech recognizer to recognize the utterance, including generating a plurality of hypotheses for the utterance; and generating a query element based on the utterance, for use in identifying one or more items from amongst the plurality of items, such that the query element includes values representing two or more hypotheses of the plurality of hypotheses.

2. A method as recited in claim 1, wherein the query element includes values representing a best hypothesis and a hypothesis other than the best hypothesis from the plurality of hypotheses.

3. A method as recited in claim 1, wherein the query element includes values representing all of the plurality of hypotheses.

4. A method as recited in claim 1, wherein the query element is a vector.

5. A method as recited in claim 1, wherein each of the hypotheses includes one or more words, wherein the query element includes a set of values, each value corresponding to one of said words, and wherein the method further comprises weighting each of the values in the query element based on a confidence measure of the hypothesis that includes the word corresponding to said value.

6. A method as recited in claim 5, wherein the confidence measure of each hypothesis is based on a rank of said hypothesis among the plurality of hypotheses.

7. A method as recited in claim 5, wherein the method further comprises weighting each of the values in the query element based on a confidence measure of the word corresponding to said value.

8. A method as recited in claim 1, further comprising applying the query element to the plurality of items to identify one or more items from amongst the plurality of items.

9. A method as recited in claim 8, wherein each of the items is a destination in a call routing system.

10. A method as recited in claim 9, wherein each of the items is a dataset in an information retrieval system.

11. A method as recited in claim 1, wherein the plurality of items are items of text data.

12. A method as recited in claim 1, wherein the plurality of items are items of audio data.

13. A method of identifying one or more items from amongst a plurality of items in response to a spoken utterance, the method comprising:

using an automatic speech recognizer to recognize the utterance, including generating a plurality of hypotheses for the utterance, wherein each of the hypotheses includes one or more words;

generating a query element for use in identifying one or more items from amongst the plurality of items, wherein the query element includes a set of values representing all of the plurality of hypotheses, each value corresponding to one of said words; and weighting each of the values in the query element based on a confidence measure of the hypothesis that includes the word corresponding to said value, wherein the confidence measure of each hypothesis is based on a rank of the hypothesis among the plurality of hypotheses.

14. A method as recited in claim 13, further comprising weighting each of the values in the query element based on a confidence measure of the word corresponding to said value.

15. A method as recited in claim 13, further comprising applying the query element to the plurality of items to identify one or more items from amongst the plurality of items.

16. A method as recited in claim 15, wherein each of the items is a destination in a call routing system.

17. A method as recited in claim 15, wherein each of the items is a dataset in a database in an information retrieval system.

18. A method as recited in claim 13, wherein the plurality of items are items of text data.

19. A method as recited in claim 13, wherein the plurality of items are items of audio data.

20. An apparatus for identifying one or more items from amongst a plurality of items in response to a spoken utterance, the apparatus comprising:

means for using an automatic speech recognizer to recognize the utterance, including generating a plurality of hypotheses for the utterance; and means for generating a set of values representing a query, for use in identifying one or more items from amongst the plurality of items, the set of values including values representing a best hypothesis and a hypothesis other than the best hypothesis from the plurality of hypotheses.

21. An apparatus as recited in claim 20, wherein the set of values includes values representing all of the plurality of hypotheses.

22. An apparatus as recited in claim 20, wherein each of the hypotheses includes one or more words, wherein each value of the set of values corresponds to one of said words, and wherein the apparatus further comprises means for weighting each of the values based on a confidence measure of the hypothesis that includes the word corresponding to said value.

23. An apparatus as recited in claim 22, wherein the confidence measure of each hypothesis is based on a rank of the hypothesis among the plurality of hypotheses.

24. An apparatus as recited in claim 22, wherein the apparatus further comprises means for weighting each of the values in the set of values based on a confidence measure of the word corresponding to said value.

25. An apparatus as recited in claim 20, further comprising means for applying the set of values to the plurality of items to identify one or more items from amongst the plurality of items.

26. An apparatus as recited in claim 25, wherein the apparatus is part of a call routing system, such that each of the plurality of items is a call destination.

27. An apparatus as recited in claim 25, wherein the apparatus is part of an information retrieval system, such that each of the plurality of items is a dataset in a database of the information retrieval system.

28. An apparatus as recited in claim 20, wherein the plurality of items are items of text data.

29. An apparatus as recited in claim 20, wherein the plurality of items are items of audio data.

30. An information retrieval system comprising:

a database;

an information retrieval engine to identify and retrieve one or more items from the database which satisfy a text-based query; and an automatic speech recognizer to generate the query in response to an utterance of a user, the automatic speech recognizer configured to:

generate a plurality of hypotheses for the utterance; and generate a query element representing the query, the query element including values representing two or more hypotheses of the plurality of hypotheses.

31. An information retrieval system as recited in claim 30, wherein the query element includes values representing all of the plurality of hypotheses.

32. An information retrieval system as recited in claim 31, wherein each of the hypotheses includes one or more words, wherein each value in the query element corresponds to one of said words, and wherein the method further comprises weighting each of the values in the query element based on a confidence measure of the hypothesis that includes the corresponding word.

33. An information retrieval system as recited in claim 32, wherein the confidence measure of each hypothesis is based on a rank of the hypothesis among the plurality of hypotheses.

34. An information retrieval system as recited in claim 32, wherein the automatic speech recognizer is further configured to weight each of the values in the query element based on a confidence measure of the word corresponding to said value.

35. An information retrieval system as recited in claim 30, wherein the information retrieval engine uses the query to retrieve text data satisfying the query from the database.

36. An information retrieval system as recited in claim 30, wherein the information retrieval engine uses the query to retrieve audio data satisfying the query from the database.

37. A call routing system comprising:

a database;

a call routing engine to identify and provide a caller with access to a call destination which satisfies a text-based query; and an automatic speech recognizer to generate the query in response to an utterance of the caller, the automatic speech recognizer configured to:

generate a plurality of hypotheses for the utterance; and generate a query element representing the query, the query element including values representing two or more hypotheses of the plurality of hypotheses.

38. A call routing system as recited in claim 37, wherein the query element includes values representing all of the plurality of hypotheses.

39. A call routing system as recited in claim 38, wherein each of the hypotheses includes one or more words, wherein each value in the query element corresponds to one of said words, and wherein the method further comprises weighting each of the values in the query element based on a confidence measure of the hypothesis that includes the corresponding word.

40. A call routing system as recited in claim 39, wherein the confidence measure of each hypothesis is based on a rank of the hypothesis among the plurality of hypotheses.

41. A call routing system as recited in claim 39, wherein the automatic speech recognizer is further configured to weight each of the values in the query element based on a confidence measure of the word corresponding to said value.

42. A call routing system as recited in claim 37, wherein the information retrieval engine uses the query to retrieve text data satisfying the query from the database.

43. A call routing system as recited in claim 37, wherein the information retrieval engine uses the query to retrieve audio data satisfying the query from the database.

* * * * *